United States Patent [19]

Peter

[11] Patent Number: 5,351,711
[45] Date of Patent: Oct. 4, 1994

[54] AUTOMATIC SEALING VALVE MOUNTED ON AN INFLATABLE BODY

[76] Inventor: Arthur M. Peter, Kronenstrasse 10, CH-8157 Dielsdorf, Switzerland

[21] Appl. No.: 947,107

[22] Filed: Sep. 18, 1992

[30] Foreign Application Priority Data

Sep. 19, 1991 [CH] Switzerland .......... 02 773/91-2

[51] Int. Cl.⁵ .......................................... F16K 15/20
[52] U.S. Cl. ................................ 137/232; 137/848; 446/222; 446/224
[58] Field of Search ............ 137/223, 232, 844, 846, 137/848; 446/222, 224

[56] References Cited

U.S. PATENT DOCUMENTS

| | | | |
|---|---|---|---|
| 1,515,645 | 11/1924 | Yablick | 137/848 |
| 1,680,757 | 8/1928 | Yablick | 137/848 |
| 1,910,961 | 5/1933 | Perry | 446/224 X |
| 2,301,479 | 11/1942 | Tousley et al. | 137/848 X |
| 2,887,120 | 5/1959 | DeSee | 137/223 |
| 2,977,973 | 4/1961 | Chakine | 137/223 |
| 3,099,288 | 7/1963 | Weis | 137/848 |
| 4,586,910 | 5/1986 | Buchanan | 446/224 X |
| 4,674,532 | 6/1987 | Koyanagi | 137/512.15 |
| 4,917,646 | 4/1990 | Kieves | 137/846 X |
| 4,924,899 | 5/1990 | Po | 137/848 X |

FOREIGN PATENT DOCUMENTS

| | | | |
|---|---|---|---|
| 640580 | 4/1928 | France | 137/848 |
| 832973 | 10/1938 | France | 137/848 |
| 144996 | 1/1931 | Switzerland | 137/846 |
| 337958 | 11/1930 | United Kingdom | 137/848 |
| 670013 | 4/1952 | United Kingdom | 137/223 |

Primary Examiner—John Rivell
Attorney, Agent, or Firm—Speckman, Pauley & Fejer

[57] ABSTRACT

An automatic sealing valve having a cylindrical inflation nozzle, which has a cone-shaped wall section in its lower area, which a welding rim adjoins. The welding rim is connected by a peripheral joint with a foil of the inflatable body. A pressure membrane is peripherally welded at the peripheral joint at the lower end of the welding rim and forms an open air passage. The annular area formed in this way is the active pressure area with which the pressure membrane presses against the welding rim. The pressure membrane has a recess below the cone-shaped edge area which is sealingly closed by a cup-shaped receptacle. The inflation nozzle can be pushed into the receptacle with its cone-shaped edge area.

18 Claims, 4 Drawing Sheets

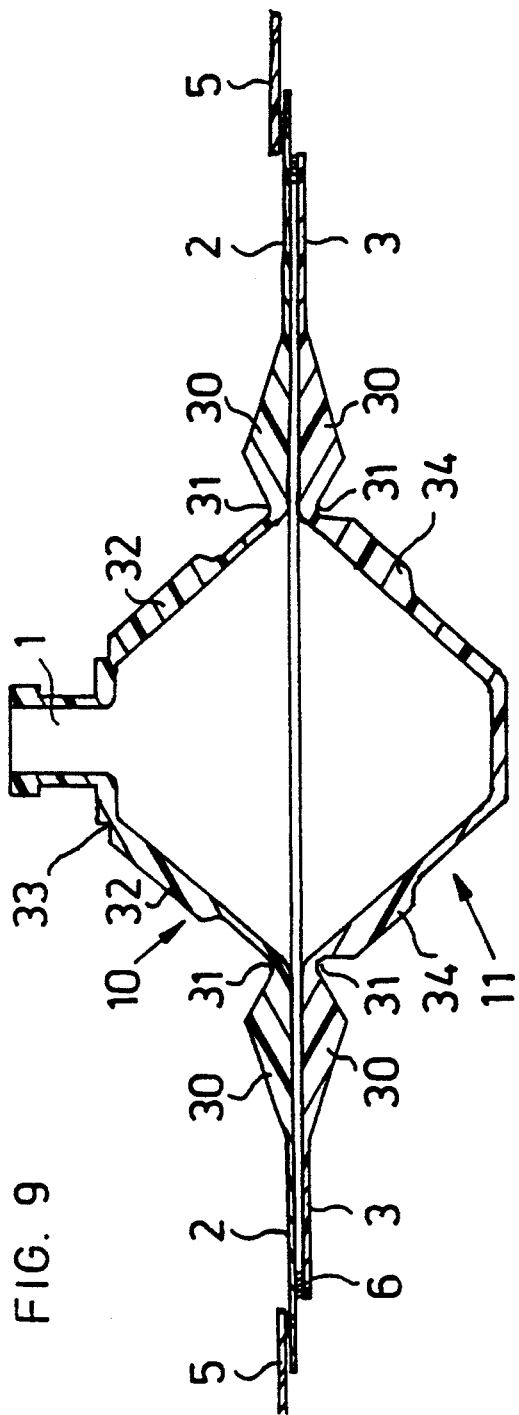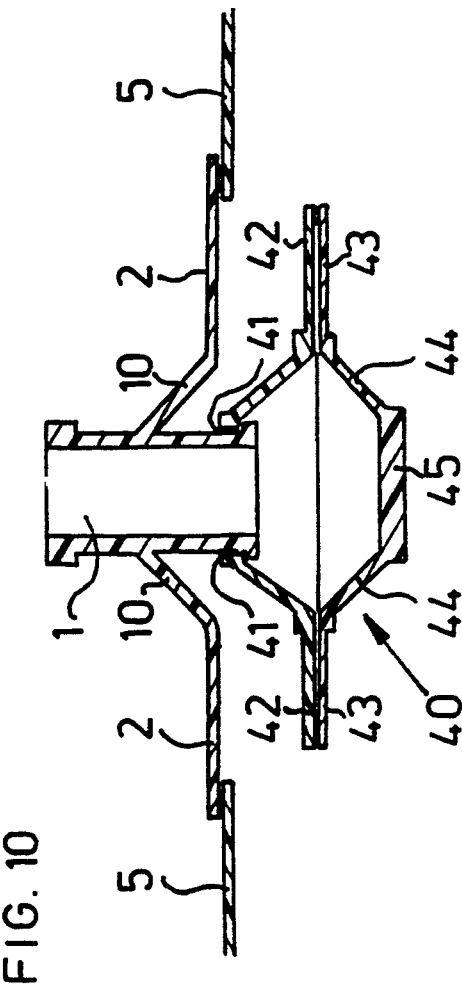

AUTOMATIC SEALING VALVE MOUNTED ON AN INFLATABLE BODY

BACKGROUND OF THE INVENTION

Field of the Invention

This invention relates to an automatic sealing valve with a cylindrical inflation nozzle having a peripherally extending welding rim for welding it to that foil of an inflatable body through which the inflation nozzle extends.

Description of Prior Art

Various types of automatic sealing valves have been on the market for several years. In such conventional sealing valves, the automatic sealing effect is generated by a small lid pivotally disposed on the end of the inflation nozzle. This relatively small lid, which is positioned opposite the inflating side of the inflation nozzle and is constructed as one piece with the inflation nozzle being pressed on the inflation nozzle by the internal pressure of an inflated inflatable body. The force from pressure acting on the inflation nozzle is conventionally very small, because the area where pressure is effective only corresponds to the open cross-sectional area of the inflation nozzle. If the internal pressure within the inflatable body is not considerable, then the sealing effect of such a valve is completely insufficient. The internal pressure in inflatable bodies in particular, such as air mattresses, beach balls, swimming aids and the like, which are often inflated by a human exhaling into the device, is relatively low. As a result, authorities in several countries have not approved such conventional sealing valves.

Manufacturers of such conventional sealing valves have therefore provided them additionally with a plug which is inserted into the inflation nozzle.

Now, if the inflation nozzle is closed off with the plug, there is no pressure difference between the two sides of the small lid and its closure effect is eliminated. Only if pressure is exerted on the inflatable body which increases the interior pressure can the small lid be forced against the inflation nozzle. As a result, the pressure on the plug is decreased. Thus the small lid only acts as protection for preventing increased pressure on the plug.

An automatic sealing valve for inflatable bodies which is completely made of foil is known from U.S. Pat. No. 4,674,532. A sack-like body, which is open towards the inside of the inflatable body, is welded between two flat foils which perpendicularly extend through the foil of the inflatable body.

The intention is to inflate this sack-like body with the internal pressure in the inflatable body and thus to plug and seal the free cross section between the two foil strips, which are welded together along their long sides. Here, too, the effective forces are very small and the sealing effect is thus minimal.

SUMMARY OF THE INVENTION

It is one object of this invention to provide an improved automatic sealing valve of the type mentioned above in such a way that the previously mentioned disadvantages of conventional sealing valves are eliminated.

It is a further object of this invention to incorporate to the greatest extent possible conventional, commercially available sealing valves with a standard inflation nozzle.

The first mentioned object is achieved with an automatic sealing valve having a peripherally extending welding rim for welding the automatic sealing valve to a foil of an inflatable body, through which the inflation nozzle extends. Two membranes sealably rest on each other below the inflation nozzle. Both membranes are connected with a linear joint which surrounds the lower edge of the inflation nozzle at a distance. The inflation nozzle extends through the upper membrane of the two membranes, and the circumferential connecting joint forms at least one open air passage. The two membranes each form an annular area which completely encircles the inflation nozzle. The two membranes are sealably positioned on top of each other under internal pressure from the inflated inflatable body.

The further object is achieved with a valve having a pressure membrane which has an approximately U-shaped base area, where the air passage is positioned in an area of an open bulge at a distance from the nozzle. Further advantageous embodiments of the valve of the invention ensue from the dependent claims and the significance and effect of such embodiments are explained in the following description, in view of the attached drawings.

BRIEF DESCRIPTION OF THE DRAWINGS

FIG. 9 is a cross-sectional view of another preferred embodiment of this invention wherein the valve has a static and dynamic sealing function; and FIG. 10 is a cross-sectional view of another valve in an embodiment for retrofitting purposes.

DESCRIPTION OF PREFERRED EMBODIMENTS

Figure 1:
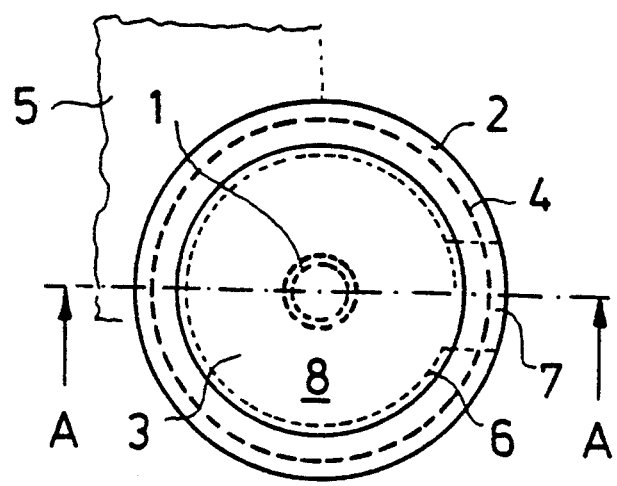
FIG. 1 is a bottom view of one preferred embodiment of the valve according to this invention.

The basic structure of the automatic sealing valve according to this invention is extraordinarily simple. The basic structure comprises a cylindrical inflation nozzle 1 and a welding rim 2 peripherally adjoining it. In this way the inflation nozzle 1 extends perpendicularly to the area formed by the welding rim 2.

In connection with the inflation nozzle 1 the term "cylindrical" does not mean that the shape of its cross section must have a special cross-sectional area, particularly not merely a circular one. Instead, such term is used as a distinction over valves having an inflation nozzle constructed of foil, which in the normal position is completely flat. A flat pressure membrane is positioned on the bottom of the welding rim 2, looking in the inflating direction, which is oriented towards the inside of the inflatable body. The pressure membrane 3 is only slightly smaller than the welding rim 2 of the valve. The pressure membrane 3 is centered with respect to the welding rim. The connection between the welding rim 2 and the pressure membrane 3 is accomplished with a linear joint 6. This linear or peripheral joint 6 extends almost completely circumferentially and only leaves open an air passage 7. The entire annular area 8 located within the linear joint 6 forms the active pressure area. Only a small area corresponding to the cross-sectional area of the inflation nozzle 1 is inactive. The pressure area constitutes in this way the relatively large annular area 8. The main purpose of the welding rim 2 is in particular to form a joint or connection with the foil 5 of the inflatable body. Therefore, the foil 5 of the inflatable body can abut the welding rim 2 at the top as well as on the bottom.

The connection between the foil 5 of the inflatable body and the welding rim 2 is also provided via a narrow, almost linear joint 4. Both linear joints 4, 6, one of which lies between the foil 5 of the inflatable body and the welding rim 2 and the other between the welding rim 2 and the pressure membrane 3, are preferably in the form of weld seams. However, it is not inconceivable to provide one or the other, or both, linear joints 4, 6 with other suitable adhesive means.

The effect of the valve of this invention is based on the fact that in the inflated state of the inflatable body the internal pressure $P_I$ is greater than the external pressure $P_A$.

The force by which the pressure membrane presses against the area of the welding rim 2 located above it depends, on the one hand, on the pressure difference between $P_A$ and $P_I$, on the other hand on the size of the active pressure area $F_A$. The construction in accordance with this invention considerably increases the size of the active pressure area $F_A$.

The welding rim 2 and the pressure membrane 3 of the just described embodiment preferably have the same shape. The linear joints 4 and 6 correspondingly extend concentric with respect to each other, with the exception of that area in which the air passage 7 is positioned.

Figure 3:
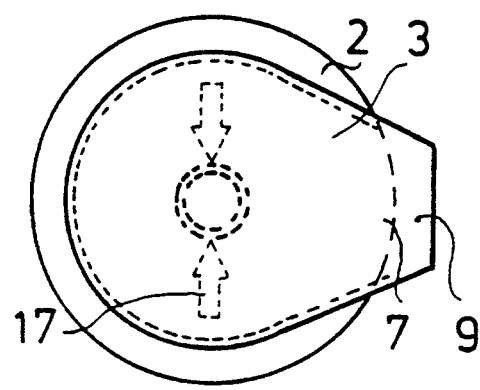
FIG. 3 is a bottom view of another preferred embodiment of the valve according to this invention.

Another preferred embodiment is shown in FIG. 3, in which the base area of the pressure membrane is shaped differently from the base area of the welding rim 2. In this particular embodiment, the pressure membrane 3 has an approximately U-shaped base area. In the state where the pressure membrane 3 is connected with the welding rim 2, the pressure membrane 3 overlaps the welding rim 2 on one side. The air passage 7 is positioned in the area where the pressure membrane 3 extends beyond the welding rim 2. Thus, the part of the U-shaped pressure membrane 3 extending beyond the welding rim 2 forms a tab 9. If the air in the inflatable body is evacuated, the foil of the pressure membrane 3 lifts off the welding rim 2. Thus, the valve is simultaneously pressed together at two different sides of the inflation nozzle 1, by means of which the welding rim 2 arches upward and the pressure membrane 3 arches downward. This effect is improved with the embodiment in accordance with FIG. 3. Care must be taken not to press on the side of the valve where the air passage 7 is positioned. To maintain such care, it is practical to apply appropriate markings on the surface of the welding rim 2 which indicate the correct direction of pressure. Because in the view shown in FIG. 3 the markings 17 are applied on the side opposite the drawing plane, they are only shown in dashed lines.

Figure 2:
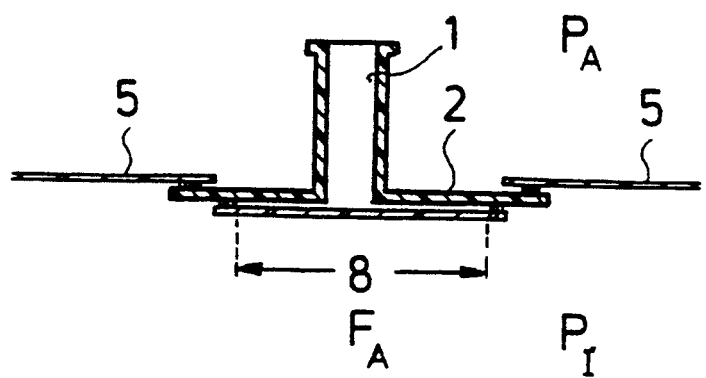
FIG. 2 is a sectional view of the embodiment shown in FIG. 1, taken along line A—A.
Figure 4:
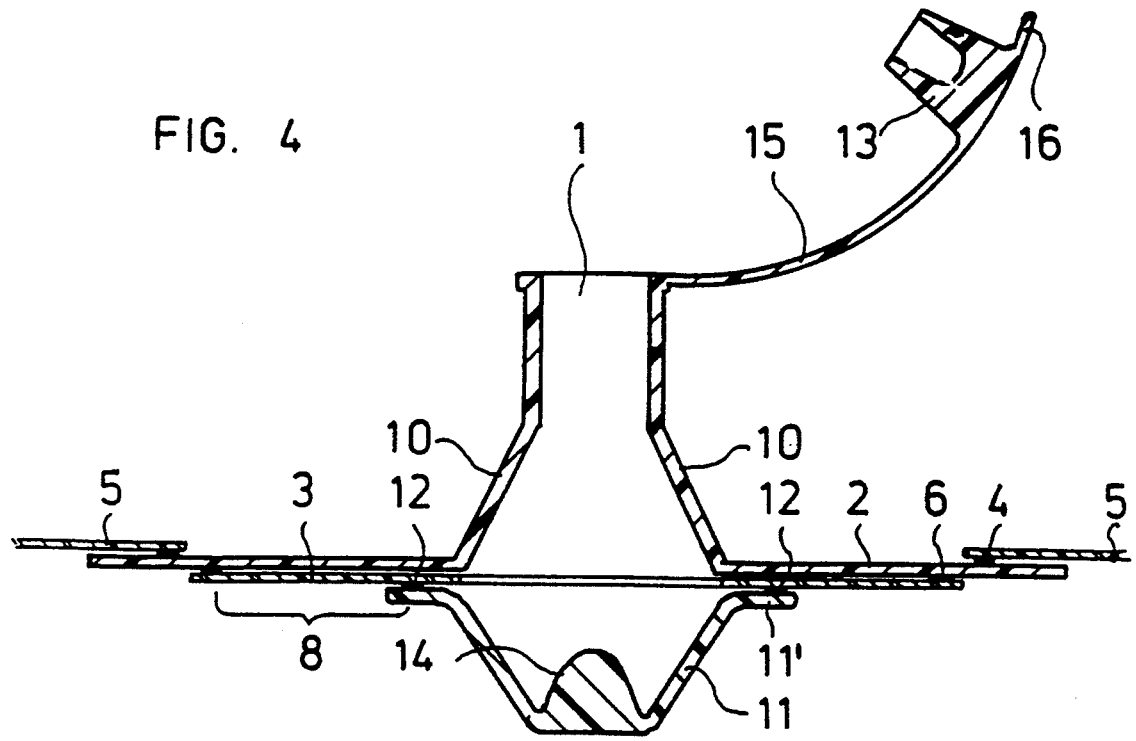
FIG. 4 is a cross-sectional view of another preferred embodiment of the valve with an inflation nozzle, shown in an open position, which can be inverted in the inflated position.
Figure 5:
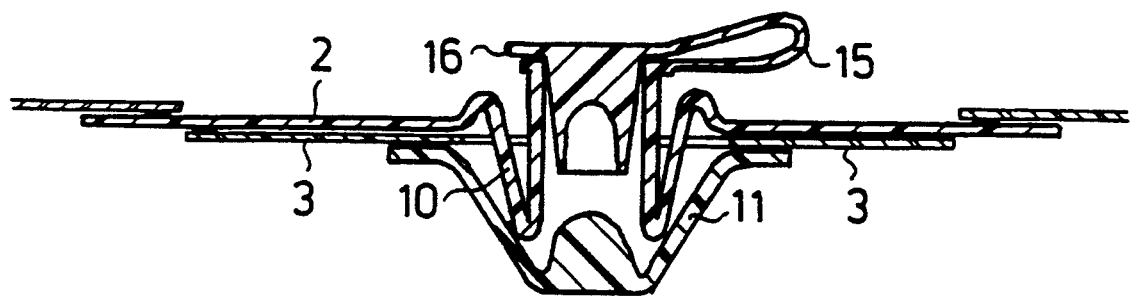
FIG. 5 is a cross-sectional view of the embodiment shown in FIG. 4 but only in a closed position, with the inflation nozzle inverted.

Depending upon the particular application, governing bodies or authorities of various countries do not permit the use of conventional automatic sealing valves by themselves and require additional safety measures. One safety measure requires the use of a plug which is inserted into the inflation nozzle 1. Such safety measure can also be used in the valve of this invention without problems. However, the protruding inflation nozzles also may cause injury and increase the danger of inadvertent removal of the plug. Thus, another preferred requirement is that it should be possible to invert, at least partially, the inflation nozzle 1 into the inflatable body. Such possibility does not exist with the embodiments shown in FIGS. 1 to 3. The embodiment shown in FIGS. 4 and 5 are necessary to accomplish this. The basic structure of the valve with all previously described preferred embodiments remains the same.

Accordingly, all elements which remain essentially the same are identified with the same reference numerals. It is important to note that the inflation nozzle 1 has a cone-shaped, flexible edge area 10 in the area above the welding rim 2. This cone-shaped, flexible edge area 10 inverts when pressure is applied to the inflation nozzle 1 and the upper edge of the inflation nozzle 1 is lowered almost as far as the height of the adjoining foil 5 of the inflatable body.

However, to accomplish this, the pressure membrane 3 must have a recess in the area below the inflation nozzle 1 and the cone-shaped edge area 10, the rim of which is sealingly welded all around to the rim 11' of a cup-shaped receptacle 11. The inflation nozzle 1, together with its inverted, cone-shaped, flexible edge area 10, is received in the cup-shaped receptacle 11. The annular area 8, which forms the active pressure area, thus surrounds the cup-shaped receptacle 11. In addition, the cup-shaped receptacle 11 can have an upwardly directed tang 14 on its bottom which, in the pressed-in state of the inflation nozzle 1 exactly fits into it.

The plug 13 is preferably positioned on the upper edge of the inflation nozzle 1 by means of an injection-molded ribbon 15 with which it is preferably connected as one piece. If the inflation nozzle 1 is sealed by pressing the plug 13 into the inflation nozzle 1, this pressure is in most cases sufficient to displace the entire inflation nozzle i downward and to invert the cone-shaped flexible wall 10. A pull tab 16, which in the closed position of the valve extends above the inflation nozzle 1, is pulled for opening it.

In the course of this, first the inflation nozzle 1 is pulled up out of its lowered position and, after overcoming the respective frictional forces, the plug 13 is pulled from the inflation nozzle 1.

Figure 6:
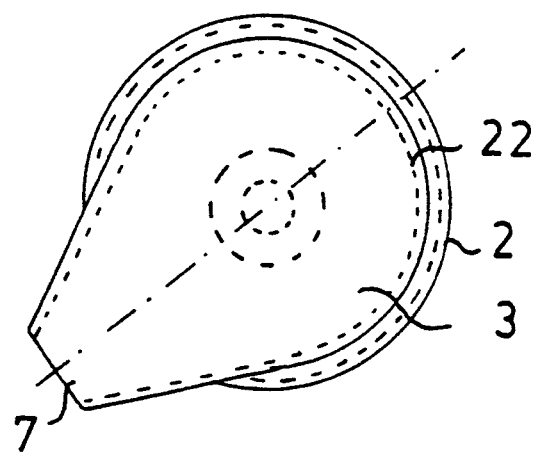
FIG. 6 is a bottom view of an embodiment of the valve of this invention, which is used for retrofitting existing valves, and which comprises two separate membranes.
Figure 7:
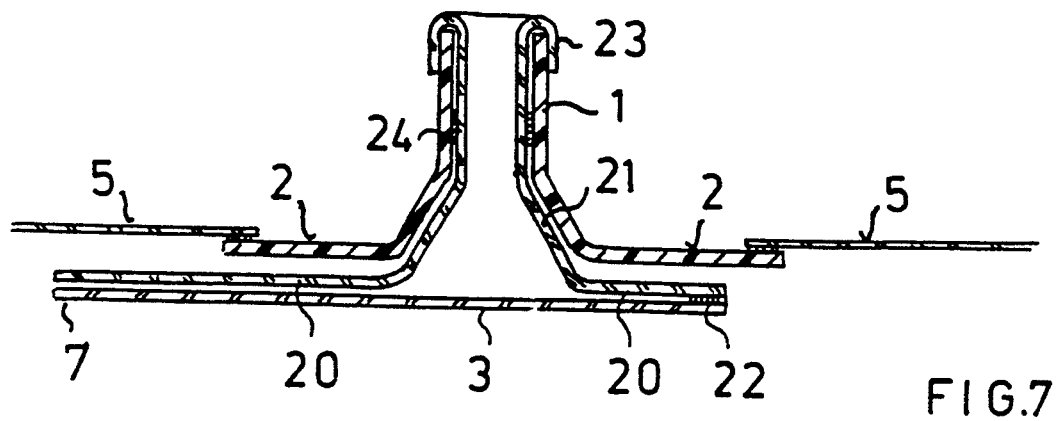
FIG. 7 is a cross-sectional view of the embodiment shown in FIG. 6.
Figure 8:
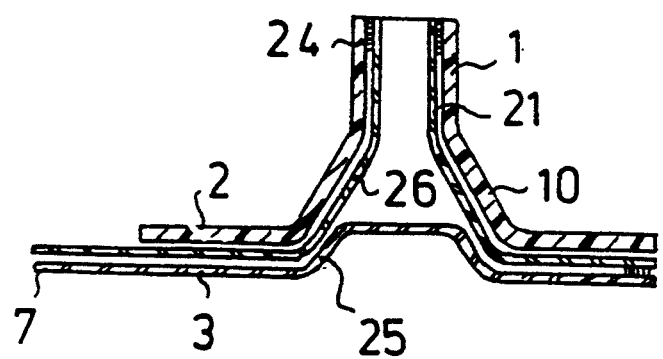
FIG. 8 is a cross-sectional view of another preferred embodiment comprising a combination which is derived from the embodiments shown in FIGS. 4 to 7.

The basic structure of the valve of the invention comprises two membranes which are welded together at a distance around the inflation nozzle 1. The upper one of the two membranes is connected with the inflation nozzle 1 of the inflatable body. In the embodiments shown FIGS. 1 to 5, simultaneous use is made of the existing inflation nozzles 1 of an inflatable body. But now, as shown by the preferred embodiments in FIGS. 6 to 8, the automatic sealing valve can also be applied later, independently of an existing inflation nozzle 1. In this embodiment no use is made of the welding rim 2. The upper membrane 20 is concretely realized in such a case. The upper membrane 20 then has its own nozzle 21, which is inserted into the existing inflation nozzle 1 of the inflatable body. In this case there is no direct connection between the upper membrane 20 and the welding rim 2 of the existing inflation nozzle 1. The shape of the upper membrane 20 and the pressure membrane 3 is then independent of the size and shape of the welding rim 2. Accordingly, the joint 4 between the pressure membrane 3 and the welding rim 2 is also omitted. A joint 22 between the upper membrane 20 and the pressure membrane 3 is required instead. Here it is of course also possible to position the air passage 7 off center. The particular advantage of such embodiment is complete freedom in choosing the material for the automatic sealing valve and the fact that material conditions of the existing inflation nozzle 1 need not be taken into consideration. The nozzle 21, which can be inserted into the existing inflation nozzle 1 therefore can be manufactured of a flexible foil material and can, as shown in FIG. 7, have an extended cylindrical part 23, which can be turned out towards the top and in this way envelops the inflation nozzle 1 from the outside as well as from the inside. Inflation nozzles are now customarily made of a plastic material containing PVC. A requirement to be wished for which, however, could not be met up to now, is that contact of the mouth with PVC or with plastics containing PVC should be avoided. Thanks to the achievement of the object of this invention, this requirement can be met without problems. However, in most cases the connection between the inflation nozzle 1 and the inserted nozzle 21 by positive locking alone will not be enough, even in those cases where the extended cylindrical part 23 of the nozzle 21 is inverted over the inflation nozzle 1. It is therefore proposed to make the connection between the insertable nozzle 21 and the inflation nozzle 1 by means of an annular weld 24 in the cylindrical part of both nozzles. However, it is also possible to push a clamping ring over the inverted part for a mechanical connection.

The free choice of the materials also allows to make the pressure membrane from a ductile foil, for example a foil which can be deep drawn. In this case it is possible to form a frustoconical elevation 25 on the pressure membrane 3, which conforms to the shape of a conical edge area 26 of the upper membrane 20. This conical edge area 26 of the upper membrane then should conform to the respective shape of the edge area 10 of the inflation nozzle 1. In such case, the internal pressure in the inflatable body pushes the frustoconical elevation 25 of the pressure membrane 3 into the corresponding edge area 26 of the upper membrane 20. Lateral pressure on the valve, which is otherwise sufficient to open the valve and to empty the inflatable body, now is no longer effective. The frustoconical elevation 25 must first be pushed out of the conical edge area 26 of the upper membrane for this. This can be done, for example, by means of a pin pushed into the nozzle from above. Another possibility, for example, includes first blowing into the inflation nozzle 1 until the two conical parts have been displaced in relation to each other and laterally pushing the valve together, as previously described.

In connection with this embodiment, it is also possible to operate with a plug. Here, too, markings 17 which indicate the appropriate direction of pressure for opening the valve can be applied to the welding rim at the side of the nozzle.

If a completely circumferential reinforcing ring 30 is concentrically embodied congruent to the linear joint at each of the two membranes 3, 2, 20, the effectiveness of the valve is significantly improved. The two reinforcing rings 30 which are applied to the outside of the membrane cause the membranes to become tight and increase the sealing strength. They also result in an immediate smoothing of the sealing membrane in case the inflatable body is not carefully folded and thus the sealing membrane is wrinkled. In addition, they also increase the spreading effect in case of lateral pressure, so that the air can escape faster at the desired moment.

Finally, FIG. 9 shows a particularly advantageous embodiment which achieves one of the objects of this invention. The valve illustrated here is again shown in section, which is preferably rotationally symmetrical. Again, a cone-shaped, flexible edge area 10 adjoins the inflation nozzle 1, which makes a transition into the welding rim 2.

The upper surface of the welding rim 2 is welded in a circumferentially sealing manner to the underside of the foil 5 of the inflatable body. The lower pressure membrane 3 is welded to the underside of the upper membrane formed by the welding rim 2 and has a cup-shaped receptacle 11. The cup-shaped receptacle 11 is preferably embodied in its position, size and shape in a mirror-reverse shape with respect to the cone-shaped, flexible wall area 10 of the upper membrane.

As shown in FIG. 9, each reinforcing ring 30 is formed directly abutting either the flexible wall area 10 or the cup-shaped receptacle 11. The reinforcing rings 30 have the previously described function. In this particular embodiment, the reinforcing rings 30 are shaped such that, starting at the outer area of the welding rim 2 and working towards the flexible edge area 10, or from the outer area of the pressure membrane 3 towards the cup-shaped receptacle 11, they first gradually increase in thickness and then more suddenly reduce to the original membrane thickness. This defined kinked area 31 increases the desired inverting effect in this area.

The flexible wall area 10 also has an annular wall thickening 32 in the area of the upper edge, which extends nearly to the lower edge of the inflation nozzle 1 and again makes a transition into a defined annular kinked or shoulder area 33 around the nozzle. A similar wall thickening 34 also provided at the cup-shaped receptacle 11, which directly adjoins the already described kinked area 31. These two wall thickenings 32, 34 result in the two conical valve parts, namely the flexible wall area 10 and the cup-shaped receptacle, sealingly cooperating in the inverted position in such a way that the valve still seals, even if the plug (not shown in the drawing of this particular embodiment) falls out of the nozzle 1. The valve shown here therefore can be classified as a true safety valve. On the one hand, the two reinforcing rings 30 on the lower and upper membrane 2, 3 act by means of the pressure force of the internal and external pressure as an actively sealing valve in the normal as well as the inverted state, and on the other hand the thickened wall areas 32, 34 act as a passively sealing valve by interlocking in the inverted state.

The reinforcing rings 30 also act in case of internal overpressure in the inflatable body. In this case there is an increased tensional force on the sealing membranes because of the elasticity of the foil 5 which counteracts the completely smooth positioning of the foils on each other. The reinforcing rings 30 are able to absorb this force to a large degree and sealing remains undisturbed.

A transitional technical achievement of the object of this invention is shown in FIG. 10. While, with the exception of the preferred embodiments shown in FIGS. 7 and 8, the embodiments up to now have shown a valve produced in accordance with the novel technology, the embodiment shown in FIG. 10 is obtained by converting a commercially available valve with a nozzle. Here, a valve is placed on the lower end of the inflation nozzle i and welded to it. The slip-on part 40 comprises an upper membrane 42 and a lower membrane 43, which are welded together along their outer periphery and only leave an air passage open, which is not shown in FIG. 10 since it does not lie in the drawing plane. The upper membrane 42 is similar to the one shown in FIG. 9, however, the inflation nozzle 1 is not directly formed on. There is only a receptacle opening 41, which in its size is adapted to the outside diameter of the inflation nozzle 1, so that a clamping connection is achieved when it is slipped on the inflation nozzle 1.

Subsequently the upper membrane 42 can be welded together with the inflation nozzle 1.

Here, too, the lower membrane 43 is embodied as cup-shaped, but it is apparent that a flat membrane would also function. In a special way, the cup-shaped receptacle 44 of the lower membrane is embodied with its bottom thickened. The thickened bottom forms a sealing plate 45, which comes to rest on the lower, open end of the inflation nozzle 1 when inverting the flexible edge area of the upper membrane or inverting the cup-shaped lower membrane 43.

The advantage of such a transitional technical achievement of the object of this invention is to be seen in particular in the low investment costs. However, this advantage coincides with a requirement for a greater structural height of the valve and thus increased manufacturing efforts.

I claim:

1. In an automatic sealing valve having a cylindrical inflation nozzle (1) with a peripherally extending welding rim (2) connected to a foil (5) of an inflatable body through which the inflation nozzle (1) extends, the improvement comprising: two membranes (3, 2, 20) sealably positioned on each other and positioned below the inflation nozzle (1), said membranes (3, 2, 20) being connected with a peripheral joint (6, 22) surrounding a lower edge of the inflation nozzle (1), the inflation nozzle (1, 21) extending through an upper membrane (2, 20) of said two membranes, said peripheral joint (6, 22) having at least one open air passage (7), said two membranes (3, 2, 20) forming an annular area (8) which completely encircles the inflation nozzle (1), said two membranes (3, 2, 20) positioned on top of each other when exposed to an internal pressure $(P_j)$ within the inflatable body, and an area of said welding rim (2) being larger than an area of a lower membrane (3) of said two membranes (3, 2, 20) and said peripheral joint (6) positioned at least partially concentric within an outer peripheral joint (4) between the foil (5) of the inflatable body and the welding rim (2).

2. In a valve in accordance with claim 1, wherein said lower membrane (3) has an approximately U-shaped base area and said air passage (7) is positioned in an area of an open bulge at a distance from the nozzle.

3. In a valve in accordance with claim 2, wherein the inflation nozzle (1) has a cone-shaped flexible edge area (10) above the welding rim (2) capable of being inverted into the inflatable body, a cup-shaped receptacle (11) is centered under the inflation nozzle (1) in said lower membrane (3), and the inflation nozzle (1) with an inverted said flexible edge area (10) is received at least partially within said cup-shaped receptacle (11).

4. In a valve in accordance with claim 3, wherein said cup-shaped receptacle (11) is a separate plastic element welded onto said lower membrane (3).

5. In a valve in accordance with claim 1, further comprising a plug (13) positioned on the inflation nozzle (1), and said plug (13) being insertable within said inflation nozzle (1).

6. In a valve in accordance with claim 1, wherein at least one of said peripheral joint (6, 22) and said outer peripheral joint (4) is a weld seam.

7. In a valve in accordance with claim 1, wherein said annular area (8) of a lower membrane (3) of said two membranes (3, 2, 20) is greater than an inner cross-sectional area of the inflation nozzle (1).

8. In a valve in accordance with claim 1, wherein said upper membrane (20) has a nozzle (21) interlockingly fitting into the inflation nozzle (1) of the inflatable body, and said nozzle (21) is connected with the inflation nozzle (1).

9. In a valve in accordance with claim 8, wherein said upper membrane (20) and said nozzle (21) has a cone-shaped divergent portion which is received in a correspondingly shaped flexible edge area (10) of the inflation nozzle (1), and a lower membrane (3) of said two membranes (3, 2, 20) has an upwardly oriented frusto-conical elevation (25) which sealably and interlockingly fits within a widening section (26) of said upper membrane (20).

10. In a valve in accordance with claim 8, wherein said nozzle (21) of said upper membrane (20) is longer than the inflation nozzle (1), and an extended cylindrical part (23) of the inflation nozzle (21) is inverted around the inflation nozzle (1).

11. In a valve in accordance with claim 3, wherein said cone-shaped flexible edge area (10) has a first reinforced annular pressure area (32) surrounded on each of a top side and a bottom side by a first kinked area (31, 33) which is thinner than said first reinforced annular pressure area (32), and said cup-shaped receptacle (11) has a second reinforced annular pressure area (34) with a second kinked area (31) on both sides.

12. In a valve in accordance with claim 1, wherein a sealing membrane is welded to a slip-on element, said upper membrane (2) has a conical flexible wall area with a receptacle opening (41) which is adapted in size to an outer diameter on the inflation nozzle (1), is welded to the inflation nozzle (1), and receives said slip-on element (42).

13. In a valve in accordance with claim 12, wherein a bottom portion of said sealing membrane (42) forms a thickened pressure plate (45).

14. In a valve in accordance with claim 1, wherein the inflation nozzle (1) has a cone-shaped flexible edge area (10) above the welding rim (2) capable of being inverted into the inflatable body, a cup-shaped receptacle (11) is centered under the inflation nozzle (1) in a lower membrane (3) of said membranes (3, 2, 20), and the inflation nozzle (1) with an inverted said flexible edge area (10) is received at least partially within said cup-shaped receptacle (11).

15. In a valve in accordance with claim 14, wherein said cup-shaped receptacle (11) is a separate plastic part welded onto said lower membrane (3).

16. In a valve in accordance with claim 3, wherein a bottom portion of said cup-shaped receptacle (11) forms a thickened pressure plate.

17. In an automatic sealing valve having a cylindrical inflation nozzle (1) with a peripherally extending welding rim (2) connected to a foil (5) of an inflatable body through which the inflation nozzle (1) extends, the improvement comprising: two membranes (3, 2, 20) sealably positioned on each other and positioned below the inflation nozzle (1), said membranes (3, 2, 20) being connected with a peripheral joint (6, 22) surrounding a lower edge of the inflation nozzle (1), the inflation nozzle (1, 21) extending through an upper membrane (2, 20) of said two membranes, said peripheral joint (6, 22) having at least one open air passage (7), said two membranes (3, 2, 20) positioned on top of each other when exposed to an internal pressure (P$j$) within the inflatable body, said upper membrane formed by the welding rim (2) surrounding the inflation nozzle (1), a lower membrane (3) of said membranes (3, 2, 20) applied to the welding rim (2) which, in a welded-on state of the valve, is oriented towards an interior of the inflatable body, and the peripheral joint (6, 22) positioned between the welding rim (2) and said lower membrane (3).

18. In an automatic sealing valve having a cylindrical inflation nozzle (1) with a peripherally extending welding rim (2) connected to a foil (5) of an inflatable body through which the inflation nozzle (1) extends, the improvement comprising: two membranes (3, 2, 20) sealably positioned on each other and positioned below the inflation nozzle (1), said membranes (3, 2, 20) being connected with a peripheral joint (6, 22) surrounding a lower edge of the inflation nozzle (1), the inflation nozzle (1, 21) extending through an upper membrane (2, 20) of said two membranes, said peripheral joint (6, 22) having at least one open air passage (7), said two membranes (3, 2, 20) forming an annular area (8) which completely encircles the inflation nozzle (1), said two membranes (3, 2, 20) positioned on top of each other when exposed to an internal pressure (P$j$) within the inflatable body, and a circumferential reinforcing ring positioned concentrically congruent to said peripheral joint (6, 22) at each of said membranes (3, 2, 20).

* * * * *